(12) United States Patent
Habermann et al.

(10) Patent No.: US 9,008,820 B2
(45) Date of Patent: Apr. 14, 2015

(54) METHOD OF COMPENSATION FOR A FLUID CUTTING APPARATUS

(75) Inventors: Charles J. Habermann, Bloomington, MN (US); Frederick J. Steinmann, Fridley, MN (US); Dean R. LaValle, Centerville, MN (US)

(73) Assignee: PaR Systems, Inc., Shoreview, MN (US)

( * ) Notice: Subject to any disclaimer, the term of this patent is extended or adjusted under 35 U.S.C. 154(b) by 762 days.

(21) Appl. No.: 13/205,254

(22) Filed: Aug. 8, 2011

(65) Prior Publication Data

US 2011/0294401 A1 Dec. 1, 2011

Related U.S. Application Data

(63) Continuation of application No. 11/499,911, filed on Aug. 4, 2006, now abandoned.

(60) Provisional application No. 60/815,032, filed on Jun. 20, 2006, provisional application No. 60/705,684, filed on Aug. 4, 2005.

(51) Int. Cl.
*G06F 19/00* (2011.01)
*B24C 1/04* (2006.01)
(Continued)

(52) U.S. Cl.
CPC . *B24C 1/045* (2013.01); *B26D 5/00* (2013.01); *B26F 3/004* (2013.01); *G05B 19/404* (2013.01);
(Continued)

(58) Field of Classification Search
CPC ....... B24C 1/045; B26F 3/004; G05B 19/404; G05B 19/416; G05B 2219/43124; G05B 2219/45036; G05B 2219/49181
USPC ......... 700/117, 118, 159, 160, 182, 186, 187; 451/5, 102
See application file for complete search history.

(56) References Cited

U.S. PATENT DOCUMENTS 4,884,189 A 11/1989 Kimura et al.
5,372,540 A 12/1994 Burch et al.
(Continued)

FOREIGN PATENT DOCUMENTS

EP 0307174 3/1989
EP 1940596 B1 5/2013
(Continued)

OTHER PUBLICATIONS

Jiyue Zeng, Mechanisms of Brittle Material Erosion Associated with High Pressure Abrasive Waterjet Processing—A Modeling and Application Study by Jiyue Zeng, University of Rhode Island, 1992.
(Continued)

*Primary Examiner* — Charles Kasenge
(74) *Attorney, Agent, or Firm* — Westman, Champlin & Koehler P.A.; Steven M. Koehler (57) ABSTRACT

A system and method for positioning a fluid stream for cutting a double contour workpiece includes a compensation module configured to receive information regarding a contour path in at least five degrees of freedom for cutting the double contour workpiece and a velocity of movement of the fluid stream during cutting and configured to provide as an output a modified contour path of said at least five degrees of freedom based on Kerf compensation errors. A motion controller is adapted to receive the modified contour path of said at least five degrees of freedom and the velocity and is configured to provide control signals. A positioner is configured to receive the control signals and position a fluid stream adjacent the workpiece accordingly.

34 Claims, 6 Drawing Sheets

(51) Int. Cl.
   B26D 5/00     (2006.01)
   B26F 3/00     (2006.01)
   G05B 19/404   (2006.01)
   G05B 19/416   (2006.01)
(52) U.S. Cl.
   CPC .... *G05B 19/416* (2013.01); *G05B 2219/43124* (2013.01); *G05B 2219/45036* (2013.01); *G05B 2219/49181* (2013.01)

(56) References Cited

U.S. PATENT DOCUMENTS

| | | | |
|---|---|---|---|
| 5,508,596 | A | 4/1996 | Olsen |
| 5,584,016 | A | 12/1996 | Varghese et al. |
| 5,854,744 | A | 12/1998 | Zeng et al. |
| 5,892,345 | A | 4/1999 | Olsen |
| 6,077,152 | A | 6/2000 | Warehime |
| 6,155,245 | A | 12/2000 | Zanzuri |
| 6,200,203 | B1 | 3/2001 | Xu et al. |
| 6,469,274 | B1* | 10/2002 | Delzenne et al. ........ 219/121.44 |
| 6,490,495 | B1 | 12/2002 | Murata |
| 6,498,319 | B1* | 12/2002 | Matsumoto et al. ..... 219/121.72 |
| 6,587,747 | B2 | 7/2003 | Hirai et al. |
| 6,609,044 | B1 | 8/2003 | Basista et al. |
| 6,612,004 | B2 | 9/2003 | Yamazaki et al. |
| 6,677,553 | B2* | 1/2004 | Matsumoto et al. ..... 219/121.81 |
| 6,766,216 | B2 | 7/2004 | Erichsen et al. |
| 6,922,605 | B1* | 7/2005 | Olsen ........................... 700/160 |
| 6,980,881 | B2 | 12/2005 | Greenwood et al. |
| 6,996,452 | B2 | 2/2006 | Erichsen et al. |
| 7,035,708 | B1* | 4/2006 | Olsen ........................... 700/160 |
| 2003/0065424 | A1 | 4/2003 | Erichsen |
| 2003/0204283 | A1* | 10/2003 | Picard et al. .................. 700/166 |
| 2004/0048548 | A1 | 3/2004 | Shepherd |
| 2004/0128016 | A1* | 7/2004 | Stewart ......................... 700/159 |
| 2004/0222571 | A1* | 11/2004 | Steffier .......................... 264/602 |
| 2004/0236461 | A1 | 11/2004 | Erichsen |
| 2004/0260422 | A1 | 12/2004 | Greenwood et al. |
| 2005/0172764 | A1 | 8/2005 | Fagan |
| 2005/0205530 | A1* | 9/2005 | Picard et al. ............... 219/121.6 |
| 2006/0108333 | A1* | 5/2006 | Picard et al. ............. 219/121.62 |
| 2007/0037496 | A1* | 2/2007 | Habermann et al. .......... 451/102 |
| 2011/0294401 | A1 | 12/2011 | Habermann et al. |

FOREIGN PATENT DOCUMENTS

| | | |
|---|---|---|
| FR | 2699852 | 7/1994 |
| JP | 6045120 | 2/1994 |
| JP | 6304898 | 11/1994 |
| JP | 2001092516 | 4/2001 |
| JP | 2005500176 | 1/2005 |
| TW | 546190 | 8/2003 |
| WO | WO 95/21044 | 8/1995 |
| WO | WO 03/018260 | 3/2002 |
| WO | WO 03/018260 | 3/2003 |

OTHER PUBLICATIONS

Hashish and du Plessis, "Prediction Equations Relating High Velocity Jet Cutting Performance to Stand Off Distance and Multipasses," in Proceedings of the Winter Annual Meeting of The American Society of Mechanical Engineers, The American Society of Mechanical Engineers, San Francisco, CA, Dec. 10-15, 1978.
Hashish, "Controlled-Depth Milling Techniques Using Abrasive-Waterjets," in Proceedings of the 12.sup.th International Conference on Jet Cutting Technology, BHR Group Limited, Rouen, France, Oct. 25-27, 1994, pp. 449-461.
Hashish, "Applications of Precision AWJ Machining," in Proceedings of the 6.sup.th American Water Jet Conference, WaterJet Technology Association, Houston, TX, Aug. 24-27, 1991.
Arola and Ramulu, "Mechanisms of Material Removal in Abrasive Waterjet Machining of Common Aerospace Materials," in Proceedings of the 7.sup.th American Water Jet Conference, WaterJet Technology Association, Seattle, WA, Aug. 28-31, 1993, pp. 43-64.
Arola and Ramulu, "Abrasive Waterjet Machining of Titanium Alloy," in Proceedings of the 8.sup.th American Water Jet Conference, WaterJet Technology Association, Houston, TX, Aug. 26-29, 1995, pp. 389-408.
Ramulu and Arola, "Abrasive Waterjet Process Dependent Performance of Polymer Composites Under Static and Dynamic Loading," in Proceedings of the 9.sup.th American Waterjet Conference, WaterJet Technology Association, Dearborn, MI, Aug. 23-26, 1997, pp. 29-46.
Jenkins et al., "Abrasive Waterjet Machining Effects on the High Temperature Degradation and Mechanical Properties of a Ceramic Matrix Composite," in Proceedings of the 9.sup.th American Waterjet Conference, WaterJet Technology Association, Dearborn, MI, Aug. 23-26, 1997, pp. 157-171.
Holmqvist and Ojmertz, "Influence of Abrasive Waterjet Cutting on the Fatigue Properties of Extra High-Strength Steel," in Proceedings of the 10.sup.th American Waterjet Conference, WaterJet Technology Association, Houston, TX, Aug. 14-17, 1999, pp. 1-13.
Hashish, "Turning, Milling, and Drilling With Abrasive-Waterjets," in Proceedings of the 9.sup.th International Symposium on Jet Cutting Technology, BHRA, Sendai, Japan, Oct. 4-6, 1988, pp. 113-131.
Hashish, "Deep Hole Drilling in Metals Using Abrasive-Waterjets," in Proceedings of the 13.sup.th International Conference on Jetting Technology, BHR Group Limited, Sardinia, Italy, Oct. 29-31, 1996, pp. 691-707.
Ramulu et al., "Abrasive Waterjet Drilling and Cutting Mechanisms in Continuous-Fiber Ceramic Composites," Proceedings of the 9.sup.th American Waterjet Conference, WaterJet Technology Association, Dearborn, MI, Aug. 23-26, 1997, pp. 109-132.
Reichman and Cheung, "Waterjet Cutting of Deep-Kerfs," in Proceedings of the Fourth International Symposium on Jet Cutting Technology, BHRA Fluid Engineering, Canterbury, England, Apr. 12-14, 1978, pp. E2-11 and E2-21.
Sheridan et al., "Microstructural and Mechanical Characterization of Threaded Composite Tubes Machined Using AWJ Cutting," in Proceedings of the 8.sup.th American Water jet Conference, WaterJet Technology Association, Houston, TX, Aug. 26-29, 1995, pp. 245-258.
Whalen, "Application of Advanced Abrasive Waterjet Machining at GE Aircraft Engines," in Proceedings of the 7.sup.th American Water Jet Conference, WaterJet Technology Association, Seattle, WA, Aug. 28-31, 1993, pp. 883-897.
Zeng et al., "Characterization of Energy Dissipation Phenomenon in Abrasive Waterjet Cutting," in Proceedings of the 6.sup.th American Water Jet Conference, WaterJet Technology Association, Houston, TX, Aug. 24-27, 1991, pp. 163-177.
Ansari et al., "Effect of Waterjet Pressure on Thermal Energy Distribution in the Workpiece During Cutting With an Abrasive Waterjet," in Proceedings of the Winter Annual Meeting of the American Society of Mechanical Engineers, The American Society of Mechanical Engineers, Chicago, IL, Nov. 27-Dec. 2, 1988, pp. 141-148.
Hashish, "Characteristics of Surfaces Machined With Abrasive-Waterjets," in Proceedings of The Winter Annual Meeting of the American Society of Mechanical Engineers, The American Society of Mechanical Engineers, San Francisco, San Francisco, CA, Dec. 10-15, 1989, pp. 23-32.
Hashish, "The Effect of Beam Angle in Abrasive-Waterjet Machining," J. of Engineering for Industry 115: 51-56, Feb. 1993.
Matsui et al., "High Precision Cutting Method for Metallic Materials by Abrasive Waterjet," in Proceedings of the 6.sup.th American Water Jet Conference, WaterJet Technology Association, Houston, TX, Aug. 24-27, 1991, pp. 127-137.
Hamatani and Ramulu, "Machinability of High Temperature Composites by Abrasive Waterjet," in Proceedings of The Winter Annual Meeting of The American Society of Mechanical Engineers, The American Society of Mechanical Engineers, Chicago, IL, Nov. 27-Dec. 2, 1988, pp. 49-62.
Hashish, "Status and Potential of Waterjet Machining of Composites," in Proceedings of the 10.sup.th American Waterject Conference, WaterJet Technology Association, Houston, TX, Aug. 14-17, 1999, pp. 811-827.

(56) References Cited

OTHER PUBLICATIONS

Singh et al., "Comprehensive Evaluation of Abrasive Waterjet Cut Surface Quality," in Proceedings of the 6.sup.th American Water Jet Conference, WaterJet Technology Association, Houston, TX, Aug. 24-27, 1991, pp. 139-161.
Henning and Anders, "Cutting-edge quality improvements through geometrical modelling," in Proceedings of the 14.sup.th International Conference on Jetting Technology, BHR Group Limited, Brugge, Belgium, Sep. 21-23, 1998.
Henning, "Computer Aided Manufacturing for Three-Dimensional Abrasive Water Jet Machining," in Proceedings of the 9.sup.th American Waterjet Conference, WaterJet Technology Association, Dearborn, MI, Aug. 23-26, 1997.
Official Search Report of the European Patent Office in counterpart foreign application No. PCT/US2006/030488 filed Aug. 4, 2006.
Second Office Action from the Japanese Patent Office in corresponding Japanese patent application 2008-525236, filed Aug. 5, 2006, 2012, dated Apr. 5, 2012, 2 pages.
Office Action for corresponding Australian patent application 2006278493, filed Aug. 4, 2006, dated Jan. 10, 2011, 2 pages.
Office Action for corresponding Chinese patent application 200680033541.8, filed Aug. 4, 2006, dated Mar. 13, 2009, 9 pages.
Second Office Action for corresponding Chinese patent application 200680033541.8, filed Aug. 4, 2006, dated Sep. 25, 2009, 11 pages.
Third Office Action for corresponding Chinese patent application 200680033541.8, filed Aug. 4, 2006, office action dated Dec. 8, 2010, 7 pages.
Office Action for corresponding Japanese patent application 2008-525236,filed Aug. 4, 2006, dated Jul. 15, 2011, 4 pages.
Office Action for corresponding Mexican patent application MX/a/2008/001696, filed Aug. 4, 2006, dated Jul. 25, 2011, 3 pages.
Communication from the European Patent Office in corresponding European patent application 06 789 415.4-2302, filed Aug. 4, 2006, dated Sep. 23, 2008, 2 pages.
Communication from the European Patent Office in corresponding European patent application 06 789 415.4-2302, filed Aug. 4, 2006, dated Jul. 16, 2010, 3 pages.
Indian Office Action dated Aug. 25, 2014 for corresponding Indian Application No. 1087/CHENP/2008, filed Mar. 4, 2008.
Office Action for U.S. Appl. No. 11/499,911, filed Aug. 4, 2006, mailed May 2, 2007.
Response filed for U.S. Appl. No. 11/499,911, filed Aug. 4, 2006, submitted Aug. 27, 2007.
Office Action for U.S. Appl. No. 11/499,911, filed Aug. 4, 2006, mailed Oct. 18, 2007.
Response filed for U.S. Appl. No. 11/499,911, filed Aug. 4, 2006, submitted Jan. 11, 2008.
Office Action for U.S. Appl. No. 11/499,911, filed Aug. 4, 2006, mailed May 9, 2008.
Response filed for U.S. Appl. No. 11/499,911, filed Aug. 4, 2006, submitted Sep. 9, 2008.
Office Action for U.S. Appl. No. 11/499,911, filed Aug. 4, 2006, mailed Apr. 2, 2009.
Response filed for U.S. Appl. No. 11/499,911, filed Aug. 4, 2006, submitted Jul. 2, 2009.
Final Office Action for U.S. Appl. No. 11/499,911, filed Aug. 4, 2006, mailed Oct. 7, 2009.
Pre-Brief Conference Request filed for U.S. Appl. No. 11/499,911, submitted Jan. 27, 2010.
Pre-Brief Appeal Conference Decision filed for U.S. Appl. No. 11/499,911, mailed Mar. 2, 2010.
Appeal Brief filed for U.S. Appl. No. 11/499,911, filed Aug. 4, 2006, submitted Jul. 2, 2010.
Office Action for U.S. Appl. No. 11/499,911, filed Aug. 4, 2006, mailed Sep. 23, 2010.
Response filed for U.S. Appl. No. 11/499,911, filed Aug. 4, 2006, submitted Jan. 24, 2011.
Final Office Action for U.S. Appl. No. 11/499,911, filed Aug. 4, 2006, mailed Apr. 8, 2011.

* cited by examiner

METHOD OF COMPENSATION FOR A FLUID CUTTING APPARATUS

CROSS-REFERENCE TO RELATED APPLICATION

The present application is a continuation of and claims priority of U.S. patent application Ser. No. 11/499,911, filed Aug. 4, 2006, which claims the benefit of U.S. provisional patent applications Ser. No. 60/705,684, filed Aug. 4, 2005, and Ser. No. 60/815,032, filed Jun. 20, 2006, the contents of which are hereby incorporated by reference in their entirety.

BACKGROUND

The discussion below is merely provided for general background information and is not intended to be used as an aid in determining the scope of the claimed subject matter.

Systems using fluid such as water to cut material precisely are well known. Typically, such systems place the fluid under extreme pressure (e.g. 30,000 psi or higher) and force the fluid through an aperture or orifice so as to be discharged at a high velocity upon the material to be cut through an erosion process. In many applications, an abrasive is also introduced into the fluid stream and discharged with the fluid to improve the efficiency of the cutting action by enhancing the erosion process.

Figure 1:
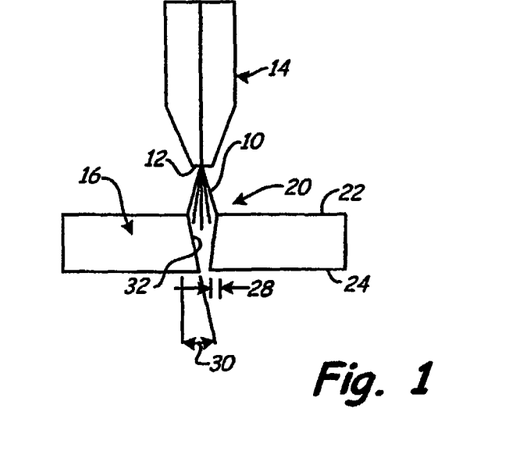
FIG. 1 is schematic illustration of a taper present in fluid stream cutting of the prior art.
Figure 2:
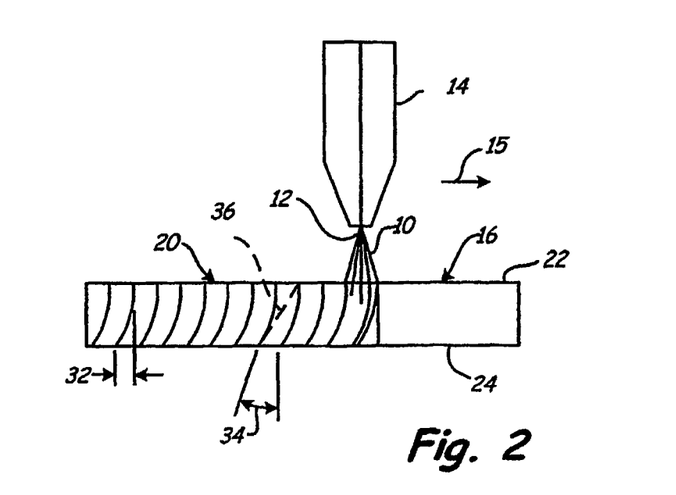
FIG. 2 is schematic illustration of fluid stream lag present in fluid stream cutting of the prior art.

Using a fluid stream to cut material produces cuts with characteristics different than those made with conventional cutters. Both FIGS. 1 and 2 illustrate a fluid stream 10 exiting an orifice 12 of a nozzle 14 to cut a workpiece 16. Typically, more than a hole is desired in the workpiece 16 so the nozzle 14 and hence the fluid stream 10 are moved along a desired path 15 relative to the workpiece 16. In FIG. 1, the nozzle 14 moves in and out of the page, while in FIG. 2 the nozzle 14 moves in the direction indicated by arrow 15.

Referring to FIG. 1, the resulting cut 20 made by the fluid stream 10 has a width on a top surface (facing the nozzle 14) that differs in width from the bottom surface 24 (facing away from the nozzle 14). The resulting taper 28 due to the difference in widths is referred to as the "Kerf angle" 30. Stated another way, the Kerf angle 30 is the angle the cut face 32 is out of parallel from the fluid stream axis (the stream is often not normal to the material surface by design). The taper 28 is a function of material thickness, but also is a function of cutting speed or movement of the nozzle 14. In general, the taper 28 becomes less as cutting speed slows, and then as cutting speed further slows beyond a point, the taper 28 reverses from that illustrated in FIG. 1 becoming narrower toward the surface 22. Compensation for the taper 28 typically includes tilting the nozzle 14 relative to the workpiece 16 about the axis of motion of the nozzle 14.

In addition to the taper 28 present in the cut, a "lag" is present due again to the thickness of the material and movement of the nozzle 14. Referring to FIG. 2, the faster the nozzle 14 moves, the more the fluid stream 10 is deflected by the material of the workpiece 16. As illustrated, a deflection distance 32 is defined as the difference in length between the point where the fluid stream 10 impinges the top surface 22 and where the stream 10 exits the bottom surface 24, whereas a "Kerf lag" can be defined as an angle 34 using a straight line 36 formed between these points. Typically, the Kerf lag 34 does not affect cutting accuracy when cutting a straight line since the exiting portion of the fluid stream 10 follows the impact point. However, on corners, for example, the deflection of the fluid stream 10 can cause cutting errors as it flares to the outside of a corner leaving behind or cutting undesirable deflection tapers. Furthermore, the finish of even straight line cuts is affected by the speed of the nozzle 14. However, unlike the taper 28, the lag 34 may be reduced by slowing the motion of the nozzle 14 across the workpiece 16. Like the taper 28, tilting of the nozzle 14, in this case, about an axis transverse to the direction of motion can also provide some compensation for the lag 34.

Systems have been advanced using compensation for Kerf errors, nevertheless improvements are desired.

SUMMARY

This Summary and the Abstract are provided to introduce some concepts in a simplified form that are further described below in the Detailed Description. The Summary and Abstract are not intended to identify key features or essential features of the claimed subject matter, nor is it intended to be used as an aid in determining the scope of the claimed subject matter. In addition, the description herein provided and the claimed subject matter should not be interpreted as being directed to addressing any of the short-comings discussed in the Background.

A system and method for positioning a fluid stream for cutting a double contour workpiece includes a compensation module configured to receive information regarding a contour path in at least five degrees of freedom for cutting the double contour workpiece and a velocity of movement of the fluid stream during cutting and configured to provide as an output a modified contour path of said at least five degrees of freedom based on Kerf compensation errors. A motion controller is adapted to receive the modified contour path of said at least five degrees of freedom and the velocity and is configured to provide control signals. A positioner is configured to receive the control signals and position a fluid stream adjacent the workpiece accordingly.

DETAILED DESCRIPTION

Figure 3:
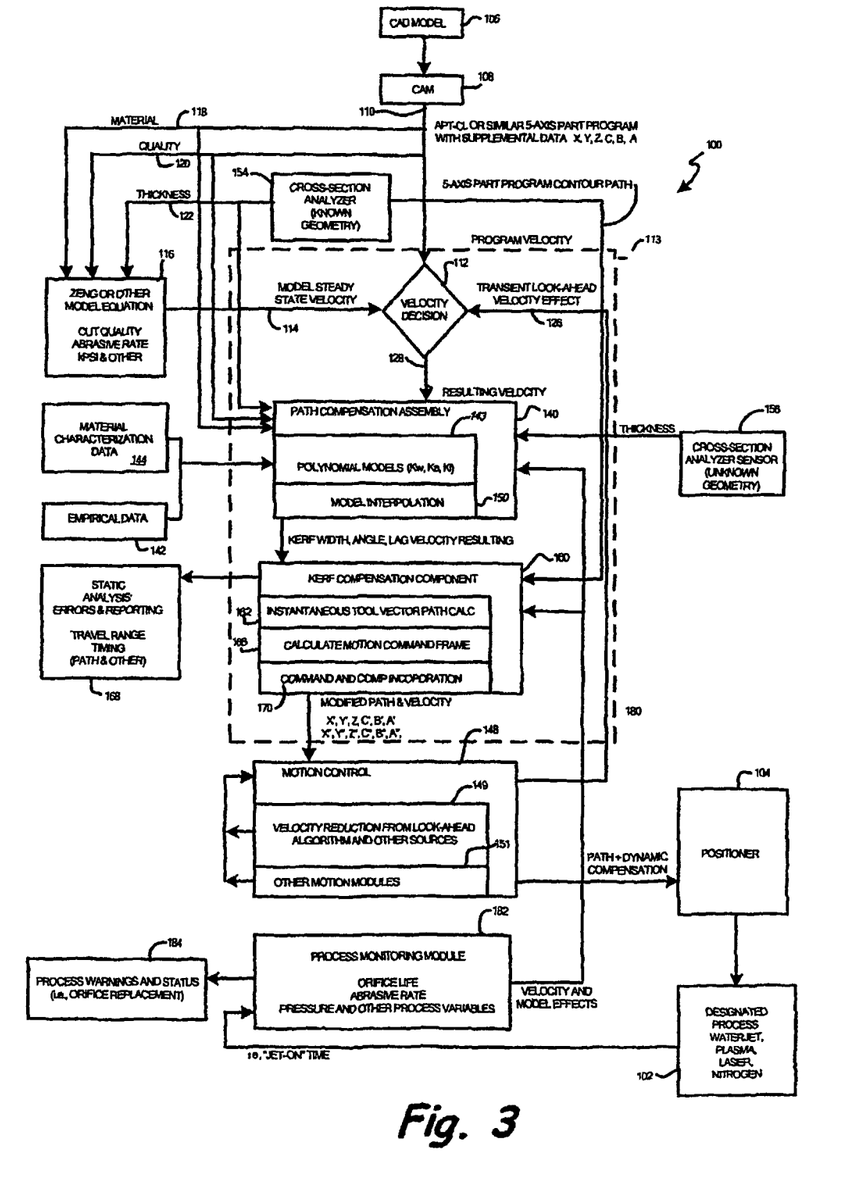
FIG. 3 is a flow diagram illustrating exemplary operation of a fluid stream cutting system.
Figure 6:
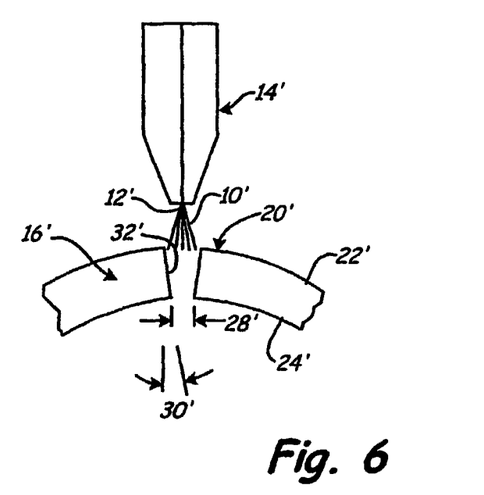
FIG. 6 is an exemplary schematic illustration of a taper present in fluid stream cutting of the present invention.
Figure 7:
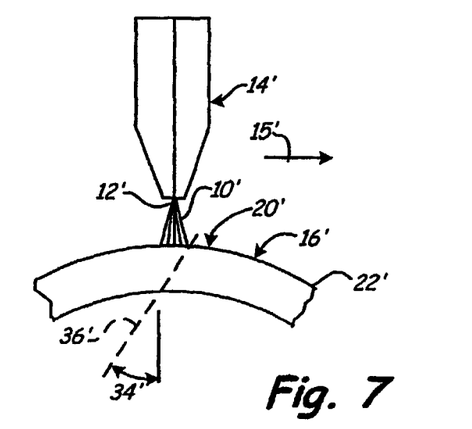
FIG. 7 is an exemplary schematic illustration of fluid stream lag present in fluid stream cutting of the present invention.

FIG. 3 is a block/flow diagram illustrating exemplary operation of a fluid stream cutting system 100. Generally, material is cut using a fluid stream cutting apparatus (also commonly referred to as a water jet system although other types of "fluids", which is defined herein as including liquids, plasma, particles, gases or combinations thereof, can be used) 102, which are well known and therefore is shown schematically. Referring to FIGS. 6 and 7, apparatus 102 includes nozzle 14'. At this point it should be noted prime numbers are used to indicated similar concepts above; however, the workpiece to be cut and the cutting process itself is different in that a complex workpiece that can have double contours and/or varying thickness is cut.

In the present embodiment, the cutting nozzle 14' of cutting apparatus 102 is moved relative to the material to be cut or workpiece by a multi-axis positioner (e.g. 5 or 6 axis control) 104. Like the cutting apparatus 102, such positioners are well known and need not be discussed in detail for purposes of understanding the concepts herein described.

Briefly, the typical technique for fluid stream cutting is to mount the workpiece (sometimes also referred to as the "material being cut") in a suitable jig. The fluid stream or fluid-jet is typically directed onto the workpiece to accomplish the desired cutting to produce a target piece having a shape and is generally under computer or robotic control. The cutting power is typically generated by means of a high-pressure pump connected to the cutting head through high-pressure tubing, hose, piping, accumulators, and filters. It is not necessary to keep the workpiece stationary and to manipulate the fluid-jet cutting tool. The workpiece can be manipulated under a stationary cutting jet, or both the fluid-jet and the workpiece can be manipulated to facilitate cutting. As will be described below, specifications of the desired workpiece to be cut are received by system 100 wherein cutting parameters such as but not limited to a cutting velocity or speed of the nozzle, its cutting path including orientation of the nozzle are determined in order to generate the desired workpiece with requisite compensation taking into account characteristics of the cutting process.

In the exemplary embodiment illustrated, workpiece specifications are embodied in a Computer-Aided Design ("CAD") program or model 106. CAD models are well known and can be developed for the desired workpiece using a computer workstation (not shown) that is separate from or part of system 100.

The CAD model 106 is provided to a Computer-Aided Machining (CAM) system 108 that is used to determine initial machining parameters in order to generate the desired the workpiece including but not limited to the cutting path (i.e. motion profile), which can then be "post processed," if necessary, into a format for a specific positioner or cutting apparatus.

Figure 4:
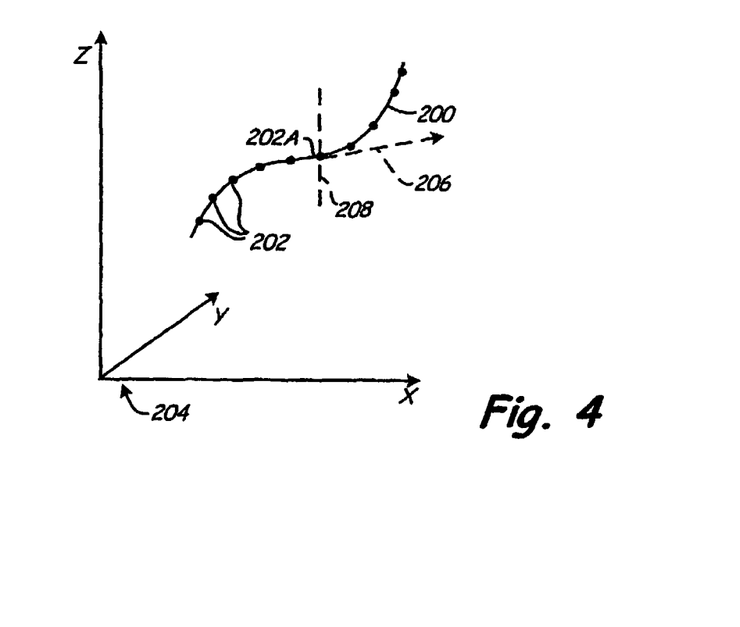
FIG. 4 is a pictorial representation of a cutting path provided with compensation.

With reference to FIG. 4, in the exemplary embodiment described herein and for purposes of understanding, a cutting path 200 for a portion of a desired workpiece can be described in terms of a sequence of datasets 202 comprising coordinates in five degrees of freedom (X,Y,Z,C,B), e.g., three translations (X,Y,Z) and two angles of tilt or coordinate system 202. It should be noted a cutting path having six degrees of freedom could also be used, where the sixth coordinate (A) relates to rotation of the cutting head about an axis orthogonal to the other mutually orthogonal axes of tilt (B,C).

At this point it should be noted that the modules illustrated in FIG. 3 and discussed below are presented for purposes of understanding and should not be considered limiting in that additional modules may be used to perform some of the functions of the modules herein described. Likewise, functions can be divided or combined in other ways between the modules. The modules can be implemented with digital and/or analog computational devices such as a computer.

A compensation module 113 illustrated generally by dashed lines is illustrated for purposes of understanding as decision block 112, path compensation assembly 140 and/or Kerf compensation component 160 and as described below provides a modified contour cutting path in at least 5 degrees of freedom and velocity.

In addition to cutting path 200, a velocity of the nozzle as a function of the cutting path can also be provided by CAM system 108 to form a "motion profile", which is represented in FIG. 3 at 110. In addition to the cutting path or contour path, input 110 can include velocity indications or criteria (e.g. maximum velocity) Nevertheless, any initial velocity, if given, may not be optimal given the cutting conditions such as but not limited to the shape of the desired workpiece. Accordingly, the velocity may be adjusted as represented by decision block 112.

A model steady state velocity input 114 to block 112 is provided from a processing component 116 using known cutting models such as that described by J. Zeng in "Mechanisms of Brittle Material Erosion Associated With High Pressure Abrasive Waterjet Processing," Doctoral Dissertation, University of Rhode Island, Kingston, R.I., 1992. In particular, Zeng describes that the cutting velocity can be determined using an equation of the form:

$$u = \left( \frac{f_a * N_m * P_w^{1.594} * d_0^{1.374} * M_a^{0.343}}{C * q * h * d_m^{0.618}} \right) 1.15$$

where
u: the cutting speed (mm/min or inch/min)
$f_a$: abrasive factor (1 for garnet)
$N_m$: machinability number
$P_w$: water pressure (MPa or kps)
$d_0$: orifice diameter (mm or inch)
$M_a$: abrasive flow rate (g/min or lb/min)
q: quality level index
h: workpiece thickness (mm or inch)
$d_m$: mixing tube diameter (mm or inch)
C: system constant (788 for Metric units or 163 for English units).

In general, component 116 receives as input the type of material being cut 118, a qualitative measure of the "quality" of the desired cut 120 and the thickness of the material 122, and other parameters as indicated above in the equation above to determine the model steady state velocity 114.

However, a further velocity effect input 126 (also referred to as "transient look-ahead velocity effect") provided herein allows the resulting velocity 128 from block 112 to be further modified based on constraints imposed by the physical movements of the nozzle. The velocity effect input 126 originates from a motion controller 148 for positioner 104, which can include a module 149 that looks for conditions of needed velocity reductions. For example, and without limitation, it may be necessary to depart from the model steady state velocity 114 when approaching a sharp corner to be cut in the workpiece, where for instance, the velocity of the nozzle must be slowed down prior to reaching the actual corner to be cut. In yet another situation, velocity reduction would be necessary if the operator operates a "stop" switch during cutting. However, other motion modules 151 can also affect velocity such as motion of the nozzle to or away from the top surface 22 as monitored, for example, by a suitable sensor. In short, transient look-ahead velocity effect input 126 is based on any motion to be performed by the cutting nozzle that causes it to depart from velocity 114.

The velocity 128 ascertained at block 112 however does not compensate for the errors contributed by Kerf width 28', taper 30' and lag 34' as discussed above, as illustrated in FIGS. 6 and 7. Path compensation assembly 140 is provided to address some of these errors. Path compensation assembly 140 is based on the use of polynomial equations or models 143 for each of the Kerf errors, Kerf width (Kw), Kerf angle (Ka) and Kerf lag (Kl) using empirical data 142 from actual cuts for various materials and material characterization data of the materials 144 along with inputs pertaining to the actual material being used, its thickness and the desired quality and the resulting velocity 128 from block 112. Steady-state (constant operating conditions including but not limited to velocity) Kerf error compensation for Kerf width (Kw), Kerf angle (Ka) and Kerf lag (Kl) is provided. However, prior techniques did not include a dynamic aspect for such compensation, which is provided by the feedback of velocity input 126 from a motion controller 148 for positioner 104. In yet a further embodiment, such compensation, either static (without input 126) or dynamic (with input 126), is provided when cutting a workpiece requiring at least degrees of freedom, that is, cutting a workpiece that can have a double contour, which is a significantly different and more complex operating environment than cutting a workpiece in a plane, yet allowing the nozzle to provide at least two degrees of tilt for Kerf compensation. Stated another way, since the dynamic constraints of the motion controller 148 as provided by the feedback of transient look-ahead velocity effect input 126 reduces the resulting velocity 128 from that which would otherwise be used, path compensation assembly 140 can calculate, in a dynamic sense, the compensation required for the Kerf based errors. Using the example of reducing the velocity for an upcoming sharp corner that needs to be cut, Kerf based errors are dynamically compensated due to the over-eroding cutting nature of fluid stream cutting as velocity of the nozzle reduces.

It should be noted that since the polynomial models for Kerf errors can also be based on the thickness of the material being cut, thickness values can be provided from a cross-section analyzer 154 based on the known geometry of the material/workpiece. However, in a further embodiment, in addition or in the alternative to cross-section analyzer 154, a cross-section analyzer sensor 156 can provide a signal related to thickness as actually measured during cutting. Examples of suitable sensors include but are not limited to mechanical, optical, electric ultrasonic based sensors. This feature of cutting material to desired shape as well as quality specifications for a constantly varying thickness is particularly useful in complex, arbitrary double contour workpieces such as airplane wing components that commonly vary in thickness.

Figure 5A:
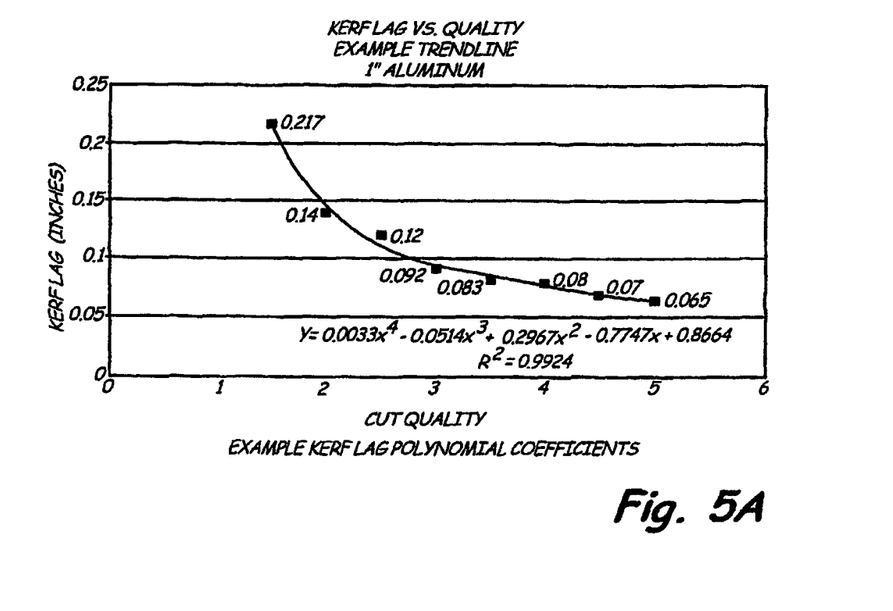
FIGS. 5A, 5B and 5C are pictorial representation of a polynomial based compensation for an exemplary material.
Figure 5B:
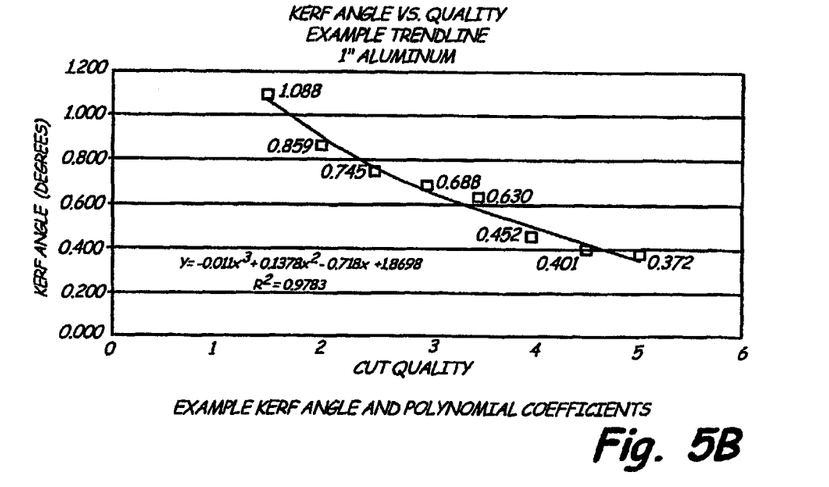
Figure 5C:
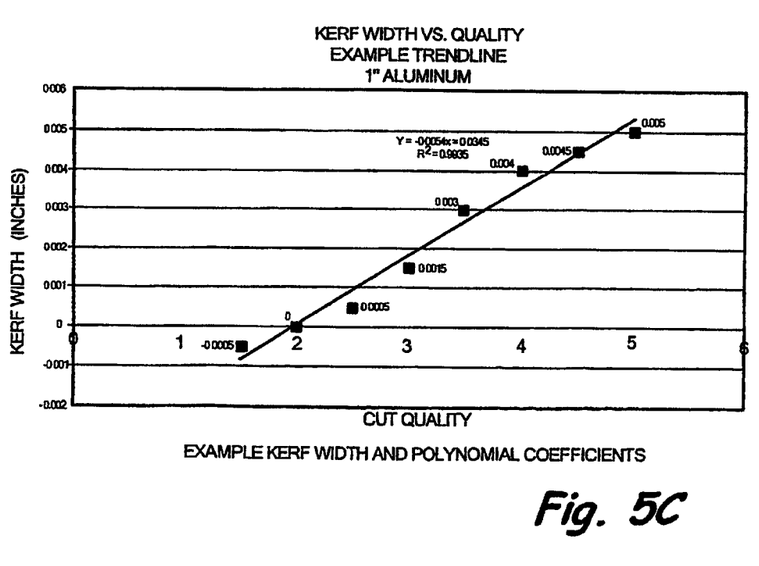

In view that the polynomial models 143 are typically based on a family of curves, a model interpolation component 150 is provided for operating points between stored curves. FIGS. 5A-5C are representations of polynomial based Kerf error compensation for an exemplary material.

A Kerf compensation component 160 accepts the Kerf width, Kerf angle, Kerf lag based errors calculated from path compensation assembly 140 as well as the velocity and the contour path datasets (X,Y,Z,C,B) for five dimensional control cutting and (X,Y,Z,C,B,A) for six dimensions, if desired, from CAM system 108. The Kerf compensation component 160 applies the Kerf compensation errors calculated by path compensation assembly 140 to the specific location of the actual contour being cut. In other words, the Kerf compensation error information provided by path compensation assembly 140 by itself is not enough to move the nozzle 14'. The Kerf compensation component 160 includes an instantaneous tool path vector calculator 162 that computes an instantaneous motion path vector from the part program point in the neighborhood of the current position so as to determine in which way compensation needs to be provided in view of what side at any given position is part of the desired workpiece versus the waste, salvage or drop material. In the illustrated embodiment, the 5 or 6 axes part program and the computed motion vector are then used to compute the instantaneous 5D or 6D motion command or tool frame by component 166. In a dynamic mode, other linear, angular, and/or velocity effects determined by the motion planner are incorporated simultaneously. The total compensation, consisting of Kerf width, Kerf angle, Kerf lag, and motion planner effects, are applied to the command frame by component 170. The resultant modified path and velocity can be stored at 168 and, if desired, a summary report containing relevant information pertaining to the cutting process can also be generated and stored also at 168 such as how long the workpiece took to be cut. It is noteworthy to realize that this report can be based on simulated cutting because given the known cutting path and the dynamic velocity changes, actual overall cutting time can then be estimated, or other problems can be detected prior to actual cutting. However, in addition, or in the alternative, in a real-time cutting mode, the modified path and velocity data is submitted, for execution by the motion controller 148.

Referring back to cutting or tool path 200 in FIG. 4, the form of compensation provided can also be explained. Path 200 is defined relative to some reference or command coordinate system 204; however, in view that at least five degrees of motion control define the cutting path 200, two degrees of tilt (surface normal vectors) are also provided. Accordingly, as indicated above, defined points 202 on the cutting path are represented (by way of example with five degrees of control) as (X,Y,Z,C,B).

At each point in the tool path 200, the adjacent points before and after the current point under consideration are examined in order to determine a instantaneous motion vector 206 at the current point (point 202A by way of example). The instantaneous motion vector 206 is then used in order to ascertain the cross-section 208 of the cut being made (FIG. 1), which is orthogonal to the instantaneous motion vector 206, as well as the cross-section along the cut (FIG. 2), which is along the instantaneous motion vector 206. Thus, the Kerf corrections are made relative to the instantaneous coordinate frame at the current position 202A and translated back into the reference coordinate system 204 as (X',Y',Z',B',C') where no velocity feedback effect 126 is provided, or as (X",Y",Z", B",C") when velocity feedback effect 126 is present.

Kerf compensation component 160 can also factor in other process variables monitored by a process monitoring module 182 such as but not limited to the changing diameter of the orifice as the nozzle wears (due for example to "Jet-on" time), abrasive rate, pressure, etc. This is illustrated by signal line 180, the input of which can also be applied to path compensation assembly 140. Although not directly pertinent to the Kerf compensation, a module 184 can be provided to signal when the nozzle requires replacement or when other process variables require attention.

In summary, some aspects herein described include Kerf compensation in a true five dimensional or more cutting environment, the compensation of which can further include dynamic compensation based on constraints or desired motion of the nozzle for other reasons besides cut quality, as well as workpieces having a constantly vary thickness. However, it should be noted the compensation herein provided is not limited to a static cutting path/orientation based on post processing of the initial cutting path (relative to CAM system 108) or compensation provided during dynamic motion control (during actual cutting), but rather a compensation mechanism that can be used in each one separately, or a combination of the foregoing situations.

Although the subject matter has been described in language specific to structural features and/or methodological acts, it is to be understood that the subject matter defined in the appended claims is not limited to the specific features or acts described above as has been held by the courts. Rather, the specific features and acts described above are disclosed as example forms of implementing the claims.

What is claimed is:

1. A method for positioning a fluid stream for cutting a double contour workpiece, the system comprising:
providing information regarding a contour path in at least five degrees of freedom for cutting the double contour workpiece and a velocity of movement of the fluid stream relative to a surface of the workpiece during cutting to a computing device;
determining with a computing device a modified contour path of said at least five degrees of freedom based on Kerf compensation errors comprising a Kerf width, a Kerf angle and a Kerf lag and the velocity of movement of the fluid stream relative to the surface of the workpiece;
receiving the modified contour path of said at least five degrees of freedom and the velocity of movement of the fluid stream relative to the surface of the workpiece at a motion controller; and
outputting control signals from the motion controller to manipulate the fluid stream adjacent the workpiece such that the fluid stream is substantially orthogonal to a surface of the workpiece along the entire contour path.

2. The method of claim 1 wherein determining the modified contour path comprises:
calculating the contour path in a reference coordinate system;
calculating the modified contour path in an instantaneous coordinate frame; and
outputting the modified contour path that is translated back to the reference coordinate system.

3. The method of claim 2 and further comprising utilizing changes in velocity of the fluid stream during cutting across the workpiece to modify the control signals.

4. The method of claim 2 and further comprising utilizing changes in velocity of the fluid stream to calculate the modified contour path.

5. The method of claim 2 further comprising calculating the modified contour path based on a change in thickness of the workpiece along the contour path.

6. The method of claim 2 wherein determining the modified contour path comprises utilizing empirical data relating to Kerf compensation to calculate the modified contour path in at least five degrees of freedom for cutting the double contour workpiece.

7. The method of claim 6 wherein the empirical data comprises polynomial equations.

8. The method of claim 6 wherein determining the modified contour path comprises calculating the modified contour path utilizing empirical data, the contour path and the velocity of movement of the fluid stream relative to the surface of the workpiece.

9. The method of claim 6
wherein determining the modified contour path comprises:
determining a tool path vector at any point along the contour path; and
utilizing the tool path vector to calculate the Kerf compensation errors.

10. The method of claim 9 wherein determining the modified contour path comprises:
determining the Kerf compensation errors in at least 5 dimensions based on the tool path vector in a coordinate system different than the contour path; and
utilizing the Kerf compensation errors in at least 5 dimensions based on the tool path vector in the coordinate system different than the contour path to provide the modified contour path.

11. The method of claim 9 and further comprising:
providing information from the motion controller to the computing device related to changes in the velocity during cutting; and
wherein determining the modified contour path comprises utilizing the information related to the changes in the velocity during cutting to adjust the modified contour path.

12. The method of claim 9 and further comprising:
providing information relating to a change in thickness of the double contour workpiece at the point of cutting; and
wherein determining the modified contour path comprises adjusting the modified contour path based on a change in thickness.

13. The method of claim 12 and further comprising modifying the Kerf compensation error information based on change in thickness.

14. The method of claim 12 and further comprising modifying the Kerf error information based on thickness from positional information pertaining to the design of the workpiece.

15. A method for providing a contour path for cutting a double contour workpiece, the method comprising:
receiving, at an input of a computing device, information regarding a contour path in at least five degrees of freedom for cutting the double contour workpiece and a velocity of movement of the fluid stream during cutting;
determining a modified contour path in said at least five degrees of freedom based on Kerf compensation errors including estimated errors from a Kerf width, estimated errors from a Kerf angle and estimated errors from a Kerf lag and an instantaneous motion vector in real time; and
outputting from the computing device the modified contour path.

16. The method of claim 15 and further comprising receiving information related to changes in velocity of the fluid stream during cutting across the workpiece, and wherein determining the modified contour path of said at least five degrees of freedom based on Kerf compensation errors includes being based on the estimated change in the velocity of the fluid cutting stream.

17. The method of claim 16 and further comprising receiving information related to changes in a thickness of the double contour workpiece at the point of cutting, and wherein determining the modified contour path of said at least five degrees of freedom based on Kerf compensation errors includes being based on a change in thickness of the workpiece.

18. The method of claim 17 wherein information regarding a contour path is provided through a computer aided design drawing.

19. A method of for providing a contour path for cutting a double contour surface on a workpiece utilizing a fluid stream, the method comprising:
providing a computer aided design of the workpiece to a computer aided machining system to determine an initial cutting path in at least five degrees of freedom and a velocity of a fluid stream relative to the workpiece;
modifying the cutting path for the workpiece to compensate for Kerf errors based upon a Kerf width, a Kerf angle and a Kerf lag and the velocity of the fluid stream relative to a surface of the workpiece; and outputting from the computer aided machining system the modified cutting path such that the workpiece can be produced having the double contour surface.

20. The method of claim 19 and further comprising:
calculating the contour path in a reference coordinate system; and
calculating the modified contour path in an instantaneous coordinate frame that is translated back to the reference coordinate system.

21. A system for positioning a fluid stream for cutting a double contour workpiece, the system comprising:
a computing device having a compensation module configured to receive, at an input, information regarding a contour path in at least five degrees of freedom for cutting the double contour workpiece and a velocity of movement of the fluid stream during cutting and configured to provide as an output a modified contour path of said at least five degrees of freedom to compensate for Kerf errors based upon a Kerf width, a Kerf angle and a Kerf lag and the velocity of the fluid stream relative to a surface of the workpiece; and
a motion controller configured to receive the modified contour path of said at least five degrees of freedom and configured to provide control signals to manipulate the fluid stream.

22. The system of claim 21 wherein the motion controller is configured to provide control signals to manipulate the fluid stream adjacent the workpiece such that the fluid stream is substantially orthogonal to each point along the contour path.

23. The system of claim 21 wherein the computing device is configured to:
calculate the contour path in a reference coordinate system;
calculating the modified contour path in an instantaneous coordinate frame; and
outputting the modified contour path that is translated back to the reference coordinate system.

24. The system of claim 21 wherein the computing device is configured to utilize changes in velocity of the fluid stream during cutting across the workpiece to modify the control signals.

25. The system of claim 23 wherein the computing device is configured to utilize changes in velocity of the fluid stream to modify the control signals.

26. The system of claim 21 wherein the computing device is configured to utilize a change in the thickness of the workpiece to modify the control signals.

27. The system of claim 21 wherein the computing device is configured to utilize empirical data relating to Kerf compensation to calculate the modified contour path in at least five degrees of freedom for cutting the double contour workpiece.

28. The system of claim 27 wherein the empirical data comprises polynomial equations.

29. The system of claim 21 wherein the computing device is configured to:
determine a tool path vector at any point along the contour path; and
utilize the tool path vector to calculate the Kerf compensation errors.

30. The system of claim 29 wherein the computing device is configured to:
determine the Kerf compensation errors in at least 5 dimensions based on the tool path vector in a coordinate system different than the contour path; and
utilize the Kerf compensation errors in at least 5 dimensions based on the tool path vector in the coordinate system different than the contour path to provide the modified contour path.

31. The system of claim 21 wherein the computing device is configured to:
receive information from the motion controller to the computing device related to changes in the velocity during cutting; and
utilize the information related to the changes in the velocity during cutting to modify the control signals.

32. The system of claim 21 wherein the computing device is configured to:
receive information relating to a change in thickness at the point of cutting; and
utilize the information related to the change in thickness to modify the control signals.

33. The system of claim 21 wherein the computing device is configured to modify information related to the Kerf errors information based on change in thickness.

34. The system of claim 21 wherein the computing device is configured to modify information related to the Kerf errors information based on thickness from positional information pertaining to a design of the workpiece.

* * * * *